United States Patent
Bray

[15] 3,703,224
[45] Nov. 21, 1972

[54] FRICTION MECHANISMS CONTAINING SILICON NITRIDE

[72] Inventor: Horace A. Bray, Coventry, England
[73] Assignee: The Dunlop Company Limited, London, England
[22] Filed: Feb. 27, 1970
[21] Appl. No.: 15,144

[30] Foreign Application Priority Data
March 6, 1969 Great Britain..........11,904/69

[52] U.S. Cl..............188/251 M, 29/182.5, 75/205, 192/107 M
[51] Int. Cl.............................................F16d 69/02
[58] Field of Search..............188/251 M; 192/107 M; 75/.5 AC, .5 BC, 205; 29/182.5

[56] References Cited
UNITED STATES PATENTS 3,306,401  2/1967  Dasse....................188/251 M
3,376,960  4/1968  Bender..............188/251 M X

FOREIGN PATENTS OR APPLICATIONS 1,052,636  12/1966  Great Britain........188/251 M Primary Examiner—George E. A. Halvosa
Attorney—Jeffers and Young

[57] ABSTRACT

A friction mechanism comprising an assembly of two relatively rotatable friction members, wherein the engaging surfaces of both friction members are provided with a sintered friction material, at least one of the friction members containing silicon nitride as a constituent. The friction material may also contain graphite and other friction and wear modifying agents such as molybdenum disulphide tin and lead, of which the following is a specification.

5 Claims, 2 Drawing Figures

FRICTION MECHANISMS CONTAINING SILICON NITRIDE

This invention relates to friction mechanisms, and particularly, but not exclusively to brakes for use in aircraft.

An object of the invention is to provide an improved friction mechanism for use in, for example, aircraft brakes, tractor and earthmover brakes, steering clutches etc., and similar high energy dissipating mechanisms.

In U.K. Pat. specification No. 1,052,636 we have described and claimed improved friction elements for use in brakes, clutches or the like, containing silicon nitride dispersed in a suitable matrix, and such friction elements have been used successfully in friction mechanisms in which the friction elements are mounted on one of two relatively rotatable friction members for engagement with the other friction member of which the surface at least is formed from a metal such as steel.

According to the present invention, a friction mechanism comprises an assembly of two relatively rotatable friction members the engaging surfaces of both friction members being provided with a sintered friction material at least one of the friction members containing silicon nitride as a constituent.

The concentration of silicon nitride in the sintered friction material of a friction mechanism according to the invention may be between 0.5 and 70 percent by weight of the friction material and preferably the concentration lies in the range 0.5 to 20 percent by weight of the friction material.

Figure 1:
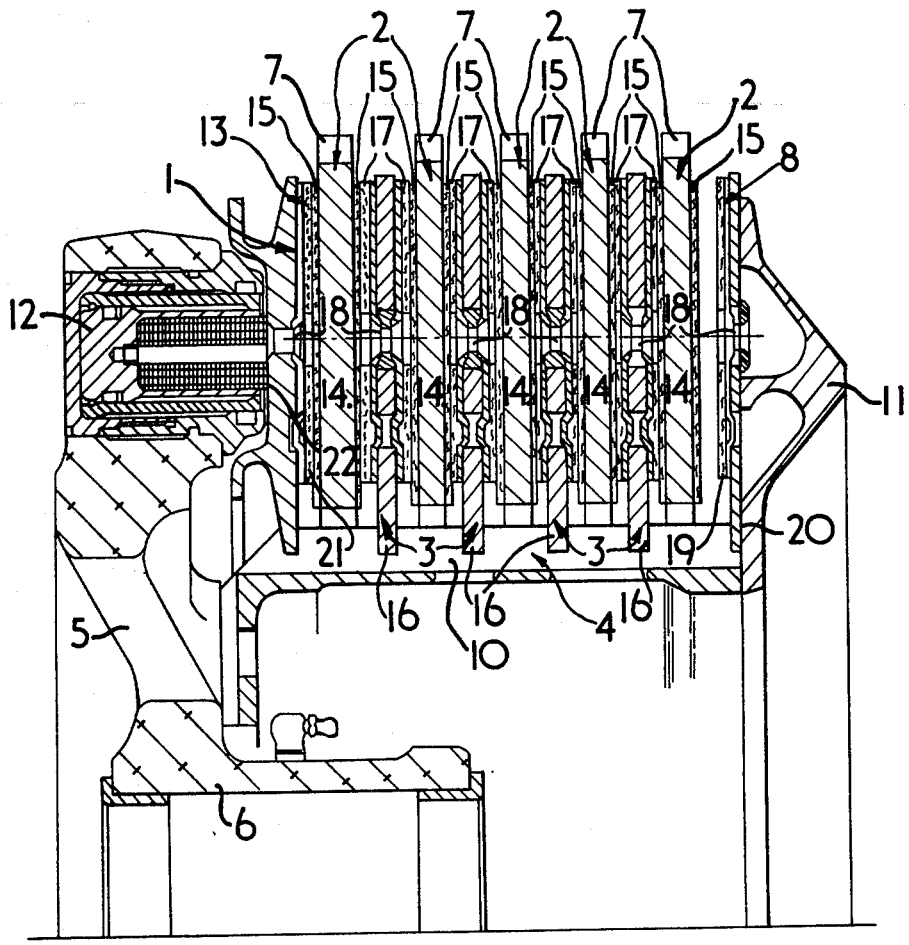
Figure 2:
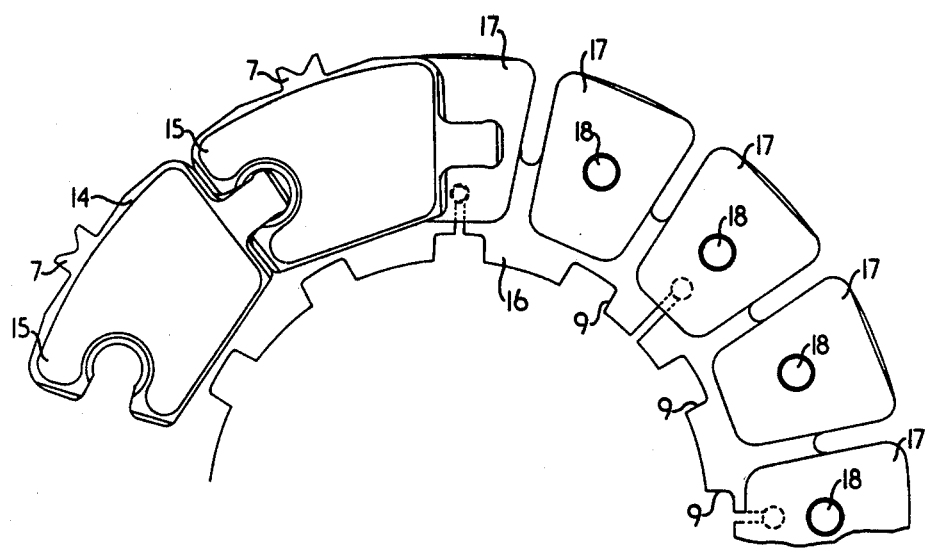

One embodiment of the invention will now be described by way of example with reference to the accompanying drawings of which:

FIG. 1 shows a cross-sectional view of one kind of aircraft disc brake in which friction mechanisms in accordance with the present invention are employed, the cross-sectional view being taken on a plane at right angles to the planes of the brake discs and FIG. 2 shows part of a rotor and stator for use in a brake of the kind shown in FIG. 1.

A friction mechanism in the form of an aircraft brake 1 (see FIG. 1) comprises an assembly of relatively rotatable friction members constituted by a series of annular rotor 2 and stator 3 brake discs mounted coaxially with and in surrounding relation to the hub of an aircraft wheel.

The rotor and stator discs are mounted in interleaved relationship on a torque tube 4 projecting axially from a torque member 5 secured to the non-rotatable wheel hub 6.

Each rotor disc 2 is keyed to the aircraft wheel by means of drive dogs 7 at the radially outer circumference of the disc engaging in corresponding keyways (not shown) formed in the wheel so that the disc is axially movable relative thereto.

Apart from the axially outermost stator disc 8, each stator disc 3 is keyed to the torque tube 4 by means of drive dogs 9 (see FIG. 2) at the radially inner circumference of the disc engaging splines 10 formed on the tube, so that the disc is axially movable relative to the tube. The axially outermost stator disc 8 is mounted in an axially fixed position on an annular reaction member 11 in the form of a flange secured to the torque tube at the axially outermost a end thereof.

Means for urging the rotor and stator discs into engagement with one another is provided in the form of a series of piston and cylinder assemblies 12 mounted on the torque member so that the pistons thereof are engageable with the axially innermost stator disc 13.

When fluid is supplied to the cylinders, the axially movable rotor and stator discs are moved by the pistons axially outwardly until the stator disc on the reaction member prevents further movement, and the rotor discs are clamped between the stator discs in frictional engagement therewith.

Each rotor disc 2 comprises an assembly of steel segments 14 (see FIG. 2) which interlock in the manner of jig-saw pieces. A rotor disc of this kind is more fully described in our U.K. Pat. specification No. 931,031. Two friction elements 15 in the form of moulded pads of sintered friction material are located one on each side of each segment of the rotor disc and bonded directly thereto.

The axially movable stator discs 3 are each in the form of a rigid steel annulus 16 (see FIG. 2) having a plurality of friction elements 17 secured thereto at closely circumferentially-spaced positions on both sides thereof. Each stator friction element comprises a moulded pad of sintered friction material bonded to a steel backing plate which itself is rivetted 18 to the rigid steel annulus.

The stator disc 8 which is secured to the reaction member 11 comprises a plurality of friction elements 19 rivetted to an annular steel backing plate 20 which is itself secured to the reaction member 11. The friction elements are constructed and arranged in a manner similar to the stator friction elements described in the last preceding paragraph.

The axially innermost stator disc 13 is constructed and arranged in a manner otherwise similar to the other axially movable stator discs, but is provided with friction elements 21 on its axially outermost side face only, its other side face 22 being formed to co-operate with the brake-applying pistons 12.

The moulded pads of sintered friction material for both the rotor and stator discs are formed by mixing silicon nitride in powder form with iron powder, powdered graphite and other friction and wear modifying agents, and sintering the mixture in a non-oxidizing atmosphere, as is more fully described in our U.K. Pat. specification No. 1,052,636. The finished pads, ready for incorporation in the brake have a composition within the following ranges, in which the iron constitutes both the matrix and a friction-modifying constituent of the friction material:

| constituent | Percentage by weight of finished pad |
|---|---|
| Silicon nitride | 0.5 to 5% |
| Graphite | 5 to 10% |
| Other friction and wear-modifying agents | 0 to 5% |
| Iron | Remainder |

The "other friction and wear-modifying agents" referred to above include, for example, lead, molybdenum disulphide and tin, and these materials are used to impart specific properties to the friction material in the manner, well-known to those skilled in the art, in which they are used in conventional friction compositions.

A typical specific formulation for a friction material for incorporation in the brake described above is as follows:

| Constituent | Percentage by weight of finished pad |
| --- | --- |
| Iron | 85 |
| Silicon Nitride | 2.5 |
| Lead | 1 |
| Graphite | 8 |
| Molybdenum Disulphide | 1 |
| Tin | 2.5 |

It has been found that an aircraft brake as described above exhibits an outstanding improvement in performance compared with otherwise similar brakes in which the sintered friction material in the rotor or stator discs is replaced by sintered friction materials not containing silicon nitride or by a steel or iron surface, or in which the sintered friction material on both rotor and stator discs is replaced by another sintered friction material not containing silicon nitride. This improvement is thought to arise from the synergistic cooperation of the silicon-nitride-containing friction surfaces.

Friction pads with compositions as described in the above specific formulation have been tested in an aircraft type disc brake on an inertia wheel dynamometer with the following results.

| Energy Absorption level ft.lbs./lb./sec. | Coefficients of friction | |
| --- | --- | --- |
| | Example 1 | Example 2 |
| 3000 | .26 | .21 |
| 5000 | .25 | .20 |
| 7000 | .22 | .19 |
| 8000 | .19 | .17 |

Example 1 shows the variation of coefficient of friction with energy loading for a brake in which both rotors and stators are provided with pads whose compositions are as described in the above specific formulation.

Example 2 shows the variation of coefficient of friction with energy loading for a brake in which either the rotors or stators are faced with steel.

These results clearly show the improvement in coefficient of friction derived from synergistic co-operation when both rotors and stators are equipped with pads containing silicon nitride.

Having now described my invention what I claim is:

1. A friction mechanism comprising an assembly of two relatively rotatable friction members having confronting engageable surfaces and wherein the engaging surfaces of both friction members are each provided with a sintered friction material containing silicon nitride as a constituent to provide a cumulative increase in coefficient of friction of not less than 10 per cent as compared with friction members having a combination of silicon nitride and steel as the confronting engageable surfaces of the friction members.

2. A friction mechanism according to claim 1 wherein the composition by weight of the friction material containing silicon nitride comprises 0.5 percent silicon nitride, 5 to 10 percent graphite and 0 to 5 percent of other friction and wear modifying agents, the remainder of the material being iron.

3. A friction mechanism according to claim 1 wherein the composition by weight of the friction material containing silicon nitride comprises 2.5 percent silicon nitride, 8 percent graphite, 1 percent lead, 1 percent molybdenum disulphide, 2.5 percent tin and 85 percent iron.

4. A friction mechanism according to claim 1 wherein the friction members contain silicon nitride in the amount of 0.5 to about 70 percent by weight of the friction material.

5. A friction composition according to claim 1 wherein the friction members contain silicon nitride in the amount of between 0.5 and 20 percent by weight of the friction material.

* * * * *